Feb. 10, 1970  J. BOWMAN  3,495,024
HOUSING CONSTRUCTION
Filed May 31, 1967  2 Sheets-Sheet 1
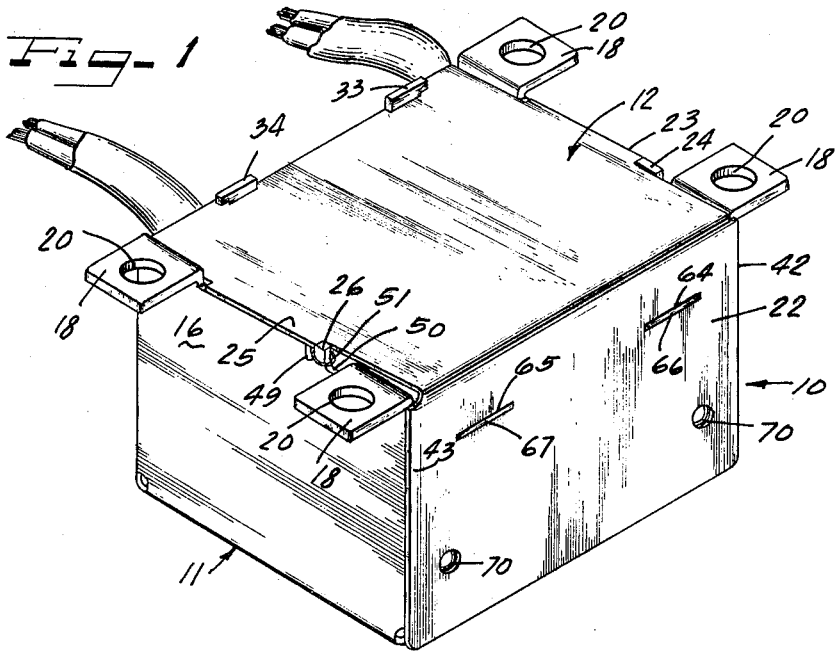
INVENTOR.
JOE BOWMAN
BY *Hill, Sherman, Meroni, Gross & Simpson* ATTORNEYS

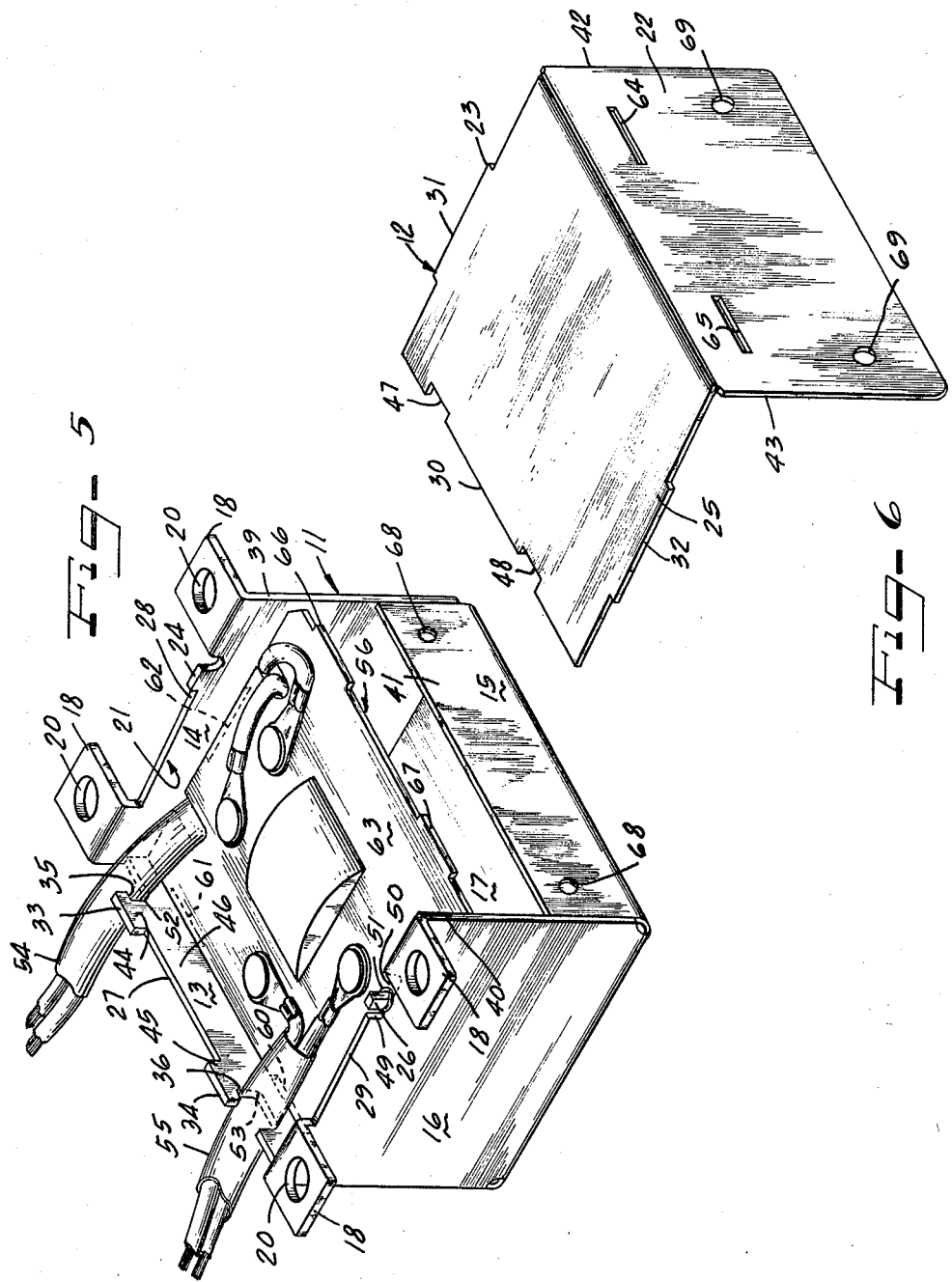

United States Patent Office 3,495,024
Patented Feb. 10, 1970

3,495,024
HOUSING CONSTRUCTION
Joe Bowman, Kokomo, Ind., assignor, by mesne assignments, to The Scott & Fetzer Company, Lakewood, Ohio, a corporation of Ohio
Filed May 31, 1967, Ser. No. 642,515
Int. Cl. H05k 5/04
U.S. Cl. 174—52
13 Claims

ABSTRACT OF THE DISCLOSURE

A housing construction having a plane mounting surface with an opening extending into the surface, the opening being closed by a cover which is retained in position by integral retaining means in the cover and casing of the housing. The cover is permanently held in the closed position by the surface on which the casing is mounted.

BACKGROUND OF THE INVENTION

Field of the invention

This invention pertains to a housing construction having a removable cover and a mounting surface.

PRIOR ART

In housing constructions for devices such as electrical components, it is often desirable to have a construction that has a cover which is self-locking to the casing. Some prior art devices have accomplished this by providing tabs on the casing which are either bent over to hold the cover on the casing or project through holes in the cover and are twisted to retain the cover in place. Since both twisted and bent tabs have very little aesthetic appeal, a housing using either the bent or twisted tabs is undesirable for utilization in an application where it will be exposed to observation by people.

It is also desirable to have a housing construction which has a mounting surface on the side in which the opening in the casing is found. If the cover is restrained or held on to the casing by means of twisted tabs or bent-over tabs, these tabs will interfere with the mounting of the casing on some smooth surface. A further disadvantage with the use of twisted tabs to hold the cover in place is the required labor for performing the twisting after the cover is installed in place on the casing and the possibility of fracture is repeatedly flexed.

SUMMARY OF THE INVENTION

The present invention entails a housing construction with the casing of the construction having mounting surfaces which form a plane and an opening which extends toward the mounting surface. Both the cover and the casing each having parts which coact to lock or retain the cover in a position substantially closing the opening without requiring any twisting or turning of any portion of either the cover or casing. The housing construction of this invention is so constructed that the mounting of the housing on a plane surface will preclude removal of the cover.

Accordingly, it is an object of the present invention to provide a housing construction consisting of a casing having an opening and a mounting surface lying in a plane, a cover with integral self-locking means to hold the cover and casing together as the cover closes the opening and with all portions of the cover and casing lying to one side of the mounting plane.

Another object of the present invention is to provide a housing construction consisting of a casing having a mounting plane and an opening on the side of the mounting surface which is closed by a cover which is retained in place by integral holding means on the cover and casing and all of the portions of both the cover and casing lie on one side of the mounting surface.

A still further object of this invention is to provide a housing casing having a mounting surface and a cover on the side of the mounting surface which closes an opening in the casing, in which the cover is flush with the mounting surface on one side of the casing and all portions of the cover and casing lie on one side of the mounting surface.

Yet another object of the present invention is to provide a housing construction in which the cover is held permanently in place on the casing by the mounting of the housing on a flat surface.

A still further object of this invention is to provide a housing construction in which the cover and casing have means to retain a part inside the casing in a fixed position when the cover is retained on the casing in a position to close an opening in the casing.

Yet another object of this invention is to provide a housing construction having a cover closing an opening in the casing and retained in the closed position by means integral with the cover and closing.

Many other advantages, features and additional objects of the present invention will become manifest to those versed in the art upon making reference to the detailed description and the accompanying sheets of drawings in which a preferred structural embodiment incorporating the principles of the present invention is shown by way of illustrative example.

THE DRAWINGS

FIG. 1 is a perspective view of the housing construction.
FIG. 2 is an end elevation of the housing construction.
FIG. 3 is a partial side elevation of one side of the housing construction.
FIG. 4 is a partial side elevation of the other side of the housing construction.
FIG. 5 is a perspective view of the casing of the housing construction with an electrical component mounted therein, and
FIG. 6 is a perspective view of the cover of the housing construction.

As shown on the drawings:
The principles of this invention are particularly useful when embodied in a housing construction generally indicated by the numeral 10. The housing construction 10 comprises a casing generally indicated by the numeral 11 and a cover generally indicated by the numeral 12.

The casing 11, as best illustrated in FIG. 5, is made up of a first side 13 and sides 14, 15 and 16 which are all integral with a bottom 17. The sides 14 and 16 each have a pair of bent tab portions 18, 18 which form mounting surfaces lying in a plane 19 for the housing construction 10. As shown in FIG. 2, the housing construction 10 lies on one side of the plane 19 of the mounting surfaces of the tab portions 18. The tab portions 18 are each provided with a hole 20 which a fastening means may pass through to mount the housing construction 10 on a flat surface.

The casing 11 has means comprising the sides 13, 14, 15 and 16 to define an opening 21, as shown in FIG. 5. The opening 21 extends into the side 15 which is opposite to first side 13. The cover 12, which closes the opening 21, has a portion 22 which extends transversely to the plane 19 of the mounting surfaces 18 and closes the extended portion of the opening 21 that is in the side opposite to the first side 13.

The casing 11 and the cover 12 have integral retaining means including two pairs of abutting ears 23, 24 and 25, 26 by which the casing 11 and cover 12 are separably retained together. The ears 23 and 25 are part of the sheet material of the cover 12, while the ears 24 and 26 are part of the casing 11. As illustrated, each of the retaining or abutting ears 23-26 lies in the same plane as the immediately adjacent portion of the casing 11 or cover 12 of which it is a part. The retaining means, as best shown in FIGS. 5 and 6, further include a plurality of edges 27, 28 and 29 of the casting 11 which engage a plurality of marginal portions 30, 31 and 32 of the cover 12 respectively.

Forming a portion of the first side 13 are a pair of tabs 33 and 34 which each have, respectively, edges 35 and 36 which are oppositely facing edge 27 which is a part of the first side 13. As shown in FIG. 2, the edge 27 engages one side or surface 37 of the marginal portion 30 of the cover 12 and the oppositely facing edges 35 and 36 engage the opposite side or surface 38 of the cover 12. The ears 23, 24 and 25, 26 coacting with the edges 27, 28, 29, 35 and 36 retain the cover 12 and limit movement of the cover 12 for removal from its retained position to a pivotal movement about an axis at the edges 27 and 35, 36. The oppositely facing edges 27 and 35, 36 are spaced from the plane 19 of the mounting portions 18 and engage and retain the cover 12 adjacent to the first side 13 in a spaced relationship from the plane 19. The cover 12 slopes toward the plane 19 from this spaced relationship adjacent the first side 13 until it is flush with the plane 19 at the side 15 opposite to the first side 13. To allow the cover 12 to have the sloping configuration, the edge 28 of side 14 and the edge 29 of side 16 slope toward the plane 19 (see FIGS. 3 and 4).

The casing 11, as shown in FIG. 5, has a pair of abutments 39 and 40 which lie in a plane formed by a surface 41 of the side 15 which faces away from the abutting surfaces of the ears 24 and 26. As illustrated in the figures, the abutments 39 and 40 are edges of the sides 14 and 16 respectively, and lie in the plane of the surface 41 which is parallel to the abutting surfaces of the ears 24 and 26. When the cover 12 is assembled with the casing 11 and retained thereon as illustrated in FIG. 1, the transverse portion 22 of the cover 12 has edge portions 42 and 43 which engage the abutments 39 and 40, respectively, and reactively urge the abutting ears 23, 24 and 25, 26 totogether to form a snug fit. As an alternative to the abutments 39 and 40, the casing 11 may have a pair of abutments 44 and 45 which are part of a surface 46 of the first side 13. The abutments 44 and 45 and the surface 46 form a plane which faces toward and is parallel to the abutting surfaces of the ears 24 and 26. The cover 12 has a pair of edges 47 and 48 which engage the abutments 44 and 45 respectively, when the cover is assembled with the casing 11 and this engagement reactively urges the ears 23, 24 and 25, 26 into a snug fit in the same manner as the ears were urged by the abutments 39 and 40.

One of the abutting ears which, as illustrated, is the ear 26 is in part defined by a pair of recesses 49 and 50 which allow the ear 26 to be utilized as an anchor for any internal part such as a member 51 illustrated in FIGS. 1 and 5 which encircles the ear 26. The member 51 will be retained in place, encircling the ear 26, by the ear 25 of the cover 12 closing the recess 49 when the cover 12 is assembled with the casing 11.

The first side 13 has a pair of recesses 52 and 53 which are adjacent to the tabs 33 and 34. The recesses 52 and 53 allow members such as electrical cables 54 and 55 which are connected to electrical device 56 disposed within the casing 11 to enter the casing 11. When the cover 12 is retained in position on the casing 11, the cover will close the recesses 52 and 53 and thereby will hold the cables 54 and 55 in their respective recesses.

The casing 11 has a first group of slot means 57, 58 and 59 disposed in the sides 13 and 14. The slots 57, 58 and 59 coact with a first group of ear means 60, 61 and 62 which are integral with a base or board 63 of the electrical device 56. The cover has a second group of slot means 64 and 65 disposed in the transverse portion 22. The slots 64 and 65 coact with a second group of ears 66 and 67 which are integral with the board 63. The coaction between the first group and the second group of ears and slots holds the board 63 in the desired position within the housing 10 when the cover 12 is assembled with the casing 11 and retained thereon.

The side 15 of the casing 11 has a pair of threaded holes 68, 68 which are aligned with a pair of holes 69, 69 in the transverse portion 22 of the cover 12 when the cover is assembled in place on the casing 11. Screws 70 are passed through the holes 69 and are in threaded engagement with the holes 68 to hold the cover in place during shipment. The holes 68 and 69 and the screws 70 have a second function of holding a nameplate (not illustrated) on the transverse portion 22 of the cover.

The casing 11 and the cover 12 may be made of stamped and bent sheet metal or they may be molded to the configuration shown in the figures.

Although various minor modifications might be suggested by those versed in the art, it should be understood that I wish to employ within the scope of the patent warranted thereon, all such embodiments as reasonably and properly come within the scope of my contribution to the art.

I claim as my invention:

1. A housing construction comprising in combination:
   (a) an open-side hollow casing of sheet material having lugs extending laterally from the peripheral edges of the open side with the faces of said lugs remote from said housing jointly defining a mounting surface lying in a plane adjacent the plane of the open side;
   (b) a cover of sheet material disposed against said casing between said open side of the casing and said mounting plane and at least substantially closing the open side; and
   (c) a plurality of coacting pairs of retaining ears respectively forming integral parts of said casing and said cover, and said ears of each pair abutting one another in a cover-removal direction for separably retaining said casing and said cover together,
   (d) all portions of said cover, said casing and said retaining ears lying at one side of said mounting plane.

2. A housing construction according to claim 1, wherein said retaining ears of said casing lie in the same plane as the immediately adjacent portions of said casing and extend to said mounting plane.

3. A housing construction according to claim 1, in which said casing sheet material has notches at opposite sides of one casing ear of a coacting pair of said ears, the end of one of said notches being closed by the cover ear of said pair of ears, whereby any structural element encircling said one casing ear is held thereon.

4. A housing construction according to claim 1, housing a plurality of edges of said casing engaging marginal portions of said cover for coacting with said ears to limit movement of said cover while so retained to a pivotal movement about an axis at one edge of said casing.

5. A housing construction according to claim 4, in which said casing has an abutment spaced from said casing ears, said cover engaging said casing abutment and being reactively urged thereby to form a snug fit between said cover and said casing ears.

6. A housing construction according to claim 5, in which said casing abutment lies in a plane parallel to the abutting surfaces of said ears.

7. A housing construction according to claim 6, in which said casing abutment forms at least part of a side of said casing facing away from the direction in which said casing ears face, and is engaged by a portion of said cover extending transversely to said mounting surface.

8. A housing construction according to claim 6, in which said casing abutment faces towards said casing ears, and is engaged by an edge of said cover.

9. A housing construction according to claim 1, a first side of said casing having at least two oppositely facing edges engaging inner and outer faces of said cover, said casing having at least one additional edge engaging one of said faces of said cover and thereby coacting with said oppositely facing edges and said ears to limit movement of said cover for removal, from the retained position, to a pivotal movement about an axis at said oppositely facing edges.

10. A housing construction according to claim 9, in which one of said oppositely facing edges is part of a tab forming a portion of said first side, said oppositely facing edges being spaced from said mounting plane, and said additional edge sloping toward said mounting plane as it extends toward a side opposite said first side, said additional edge acting jointly with said oppositely facing edges to support said cover in a spaced relationship from said mounting plane adjacent to said first side and flush with said mounting plane at said opposite side.

11. A housing construction according to claim 10, in which there is a recess in said first side adjacent to said tab, the end of said recess near said mounting plane being closed by said cover for holding in any member disposed in said recess.

12. A housing construction comprising in combination:
(a) an open-side hollow casing of sheet material having its mounting surface lying in a plane adjacent to the plane of the open side;
(b) a cover of sheet material disposed against said casing and at least substantially closing said opening;
(c) retaining means forming integral parts of said casing and said cover by which said cover and said casing are separably retained together;
(d) all portions of said casing, said cover and said retaining means lying at one side of said mounting plane; and
(e) a base disposed in said casing, said casing and said base having first coacting integral interfitting ear and slot means, and said cover and said base having second integral coacting interfitting ear and slot means arranged for coaction with said first ear and slot means and thereby rigidly supporting said base.

13. A housing construction according to claim 12, in which an opening contiguous to the open side extends at least partially into a second side of said casing and said cover has a portion extending angularly to said mounting surface in closing relation to said second side of said casing, said second ear and slot means acting on said angularly extending portion of said cover.

References Cited

UNITED STATES PATENTS

| 983,162 | 1/1911 | Murray et al. | 220—3.92 |
| 1,914,011 | 6/1933 | Eccles | 220—3.8 X |
| 1,950,552 | 3/1934 | Hansen | 220—3.8 X |
| 3,025,337 | 3/1962 | Leoni | 174—58 X |
| 3,029,964 | 4/1962 | Hudson et al. | 220—3.8 X |
| 1,296,653 | 3/1919 | Griswold | 220—3.8 |
| 1,672,683 | 6/1928 | Knoderer | 220—3.8 |
| 2,665,353 | 1/1954 | Popp | 220—3.8 X |
| 2,924,639 | 2/1960 | Zelt | 220—3.8 X |

FOREIGN PATENTS

| 322,825 | 12/1929 | Great Britain. |
| 330,676 | 6/1930 | Great Britain. |

JOSEPH R. LECLAIR, Primary Examiner

JAMES R. GARRETT, Assistant Examiner

U.S. Cl. X.R.

220—3.8

UNITED STATES PATENT OFFICE
CERTIFICATE OF CORRECTION

Patent No. 3,495,024          Dated February 10, 1970

Inventor(s) Joe Bowman

It is certified that error appears in the above-identified patent and that said Letters Patent are hereby corrected as shown below:

Column 3, line 41; "to-" should be deleted

Column 4, line 54; "hous-" should be deleted line 55; "ing" should read --having--.

Signed and sealed this 6th day of July 1971.

(SEAL)
Attest:

EDWARD M. FLETCHER, JR.          WILLIAM E. SCHUYLER, JR.
Attesting Officer                 Commissioner of Patents

FORM PO-1050 (10-69)